United States Patent [19]

Netravali et al.

[11] 4,218,704
[45] Aug. 19, 1980

[54] METHOD AND APPARATUS FOR VIDEO SIGNAL ENCODING WITH MOTION COMPENSATION

[75] Inventors: Arun N. Netravali, Matawan; John D. Robbins, Aberdeen, both of N.J.

[73] Assignee: Bell Telephone Laboratories, Incorporated, Murray Hill, N.J.

[21] Appl. No.: 21,071

[22] Filed: Mar. 16, 1979

[51] Int. Cl.$^2$ .............................................. H04N 7/12
[52] U.S. Cl. ...................................... 358/136; 375/28
[58] Field of Search ................. 358/136, 93, 105, 160; 325/38 B

[56] References Cited

U.S. PATENT DOCUMENTS

| | | | |
|---|---|---|---|
| 3,603,725 | 9/1971 | Cutler | 358/136 |
| 3,632,865 | 1/1972 | Haskell et al. | |
| 3,716,667 | 2/1973 | Conner et al. | |
| 3,723,644 | 3/1973 | Haskell et al. | |
| 3,890,462 | 6/1975 | Limb et al. | |
| 4,133,006 | 1/1979 | Iinuma | 358/136 |
| 4,144,543 | 3/1979 | Koga | 358/136 |

OTHER PUBLICATIONS

"A Method for the Construction of Minimum-Redundancy Codes" *Proc.* of I.R.E., 1952, pp. 1098-1101.
"Television Bandwidth Compression Utilizing Frame to Frame Correlation and Movement Compensation" Symposium on Picture Bandwidth Compression (MIT, Cambridge, Mass.) Gordon & Breach, 1972 pp. 673-693.

*Primary Examiner*—Richard Murray
*Attorney, Agent, or Firm*—Barry H. Freedman

[57] ABSTRACT

A motion compensated video encoder includes apparatus (100) for recursively updating an estimate of displacement in the moving area of a picture, and for predicting the intensity values of elements of the picture using the displacement estimate. Address information is encoded for background (non-moving) elements and for moving elements for which the motion compensated prediction errors are satisfactorily small. For uncompensable pels, where the error exceeds a threshold, both address information and error values are encoded. The displacement estimate can also be encoded, if desired.

20 Claims, 8 Drawing Figures

SEGMENT DETECTOR AND ENCODER 320

SEGMENT DETECTOR AND DECODER 704

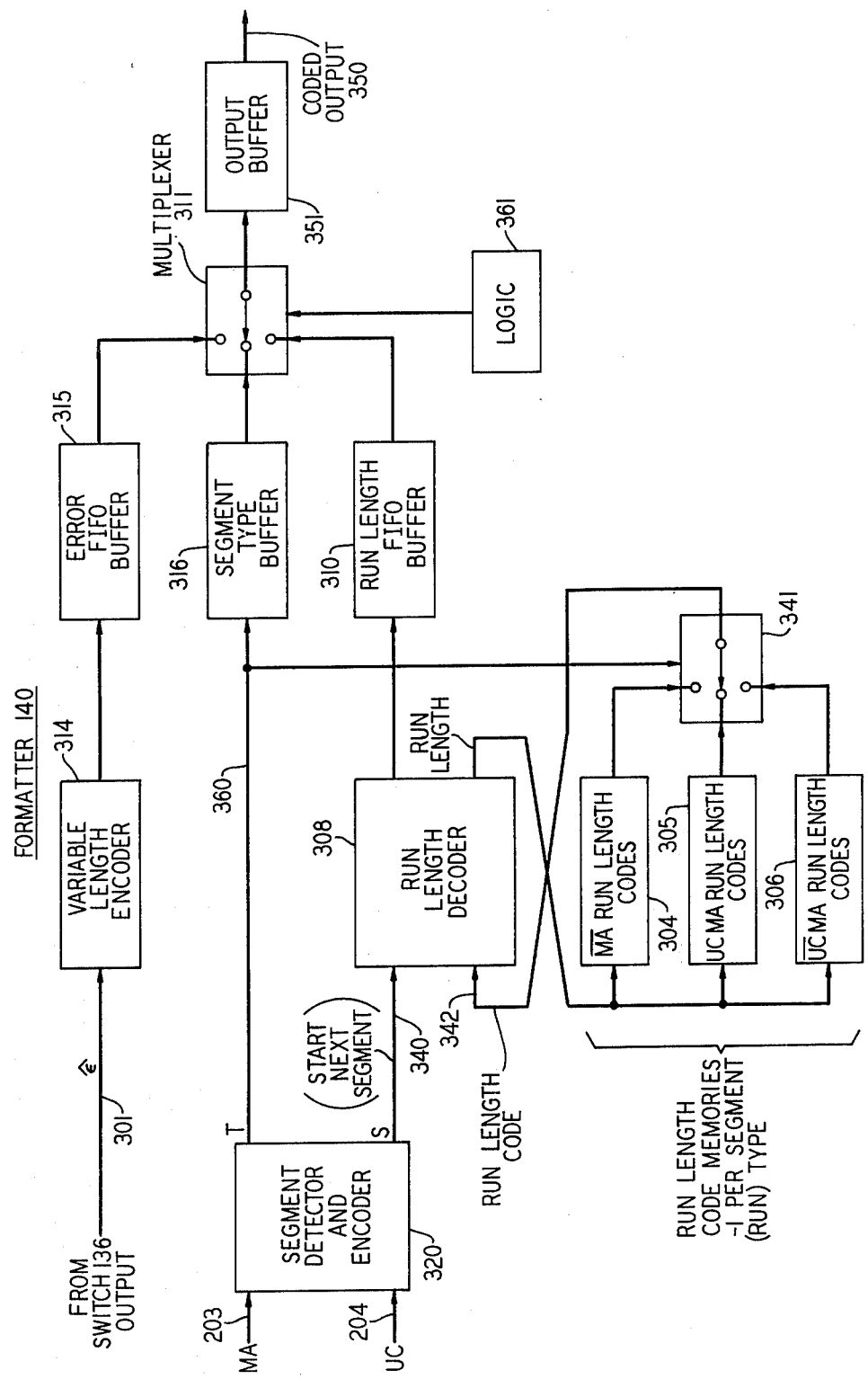

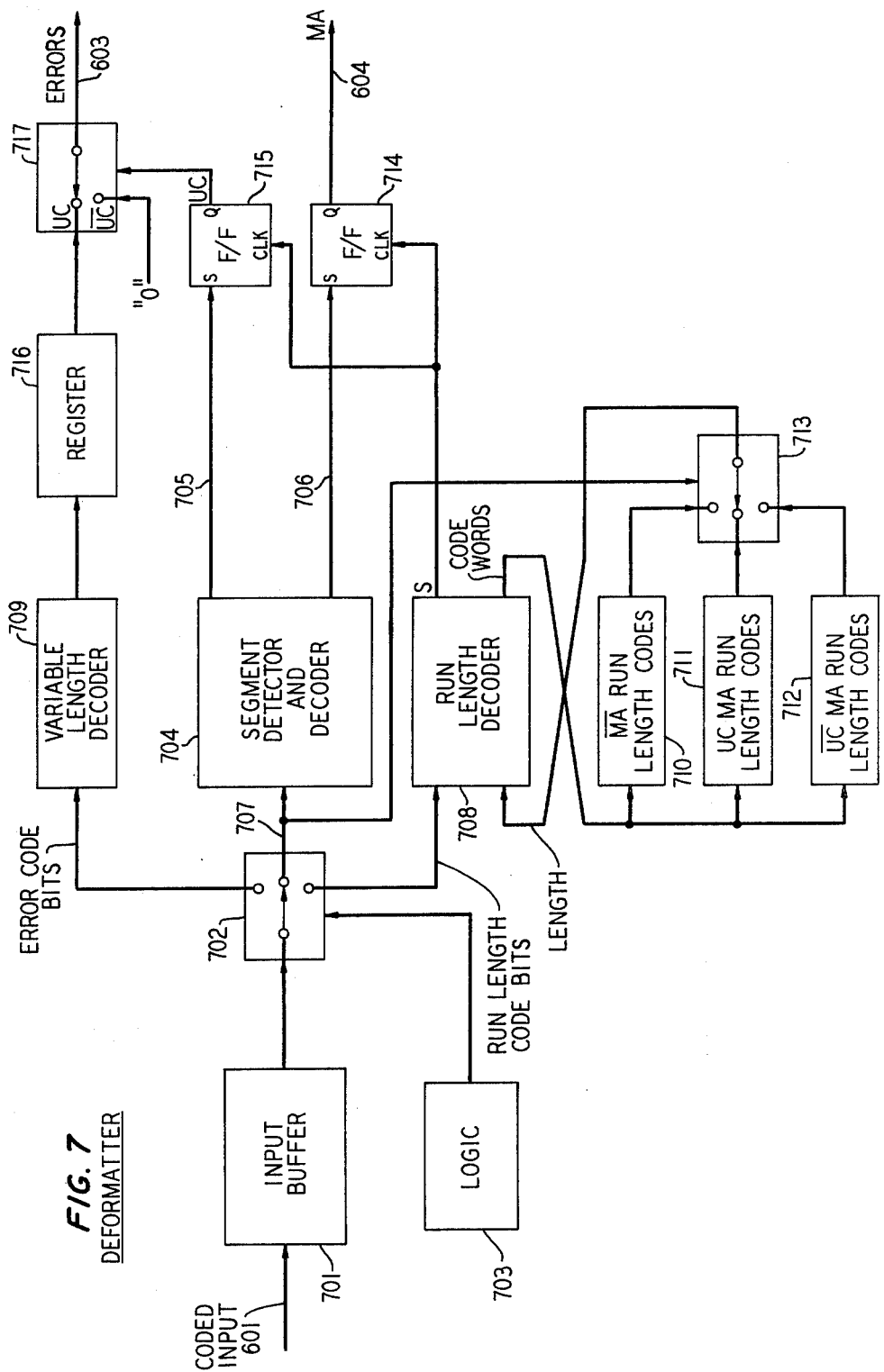

METHOD AND APPARATUS FOR VIDEO SIGNAL ENCODING WITH MOTION COMPENSATION

BACKGROUND OF THE INVENTION (1) Field of the Invention

This invention relates generally to encoding of video information and, more particularly, to predictive encoding using motion compensation.

(2) Description of the Prior Art

In U.S. Pat. No. 3,632,865 issued to B. G. Haskell et al on Jan. 4, 1972, it was recognized that television scenes containing objects moving more or less in translation could be more efficiently encoded by computing and then encoding the intensity differences between picture elements in the moving area with respect to elements in the previous frame which are appropriately translated or displaced. In a similar manner, differences could be constructed from linear combinations of picture elements. Another reference describing motion compensated coding is "Television Bandwidth Compression Utilizing Frame to Frame Correlation and Movement Compensation", F. Rocca, Symposium on Picture Bandwidth Compression, (MIT, Cambridge, Mass., 1969) Gordon and Breach, 1972.

In the Haskell system, two types of picture areas are identified, namely, moving areas and background. The picture information is encoded by identifying (1) the address of the picture elements in the moving area, (2) the average amount of translation for a group of pels in the moving area, and (3) prediction error values for the moving area pels. While the Haskell et al approach is successful in increasing the encoder efficiency, several problems nevertheless remained. First, estimation of displacement required a large number of complex calculations, and the estimate was not accurate when a large number of moving objects existed, or when different parts of an object moved differently. Second, the encoder did not adequately distinguish between truly moving objects and uncovered background areas, thereby wasting an opportunity for still further efficiency increases.

Many of the above-mentioned problems with displacement estimation are overcome by the invention described in applicants' concurrently filed application Ser. No. 021063 entitled "Technique for Estimation of Displacement and/or Velocity of Objects in Television Scenes". In accordance with that invention, displacement is estimated recursively, using the previous estimate to form successive updates or correction terms. However, since the estimates are generally updated on a pel by pel basis, applicants' estimation apparatus is not readily compatible with the prior art encoder of Haskell, because that encoder requires a single displacement estimate per field, frame or block of data.

In view of the foregoing, it is the broad object of the present invention to improve the efficiency of motion compensated coding of video signals, using improved motion estimation techniques. Specific objects are to provide a coder which can distinguish between truly moving areas and uncovered background and which can compensate adequately in the case of multiple moving objects. Naturally, the encoder must be readily implemented without unduly complex or expensive circuitry.

SUMMARY OF THE INVENTION

The foregoing and additional objects are achieved in accordance with the instant invention by a motion compensated coder which utilizes a motion estimation technique which is recursively updated on a pel by pel basis. The encoder operates to separate moving areas from background, and then to further categorize the moving areas as compensable or non-compensable. For each pel in the non-compensable areas, the prediction error value is encoded for transmission. On the other hand, intensity data need not be encoded for pels in the background and the compensable areas, since this information can be accurately reconstructed in the decoder.

BRIEF DESCRIPTION OF THE DRAWING

The present invention will be more readily appreciated by consideration of the following detailed description when read in light of the accompanying drawing in which:

FIG. 3 is a block diagram of formatter 140 of FIG. 1;

FIG. 7 is a block diagram of deformatter 602 of FIG. 6; and

DETAILED DESCRIPTION

Figure 1:
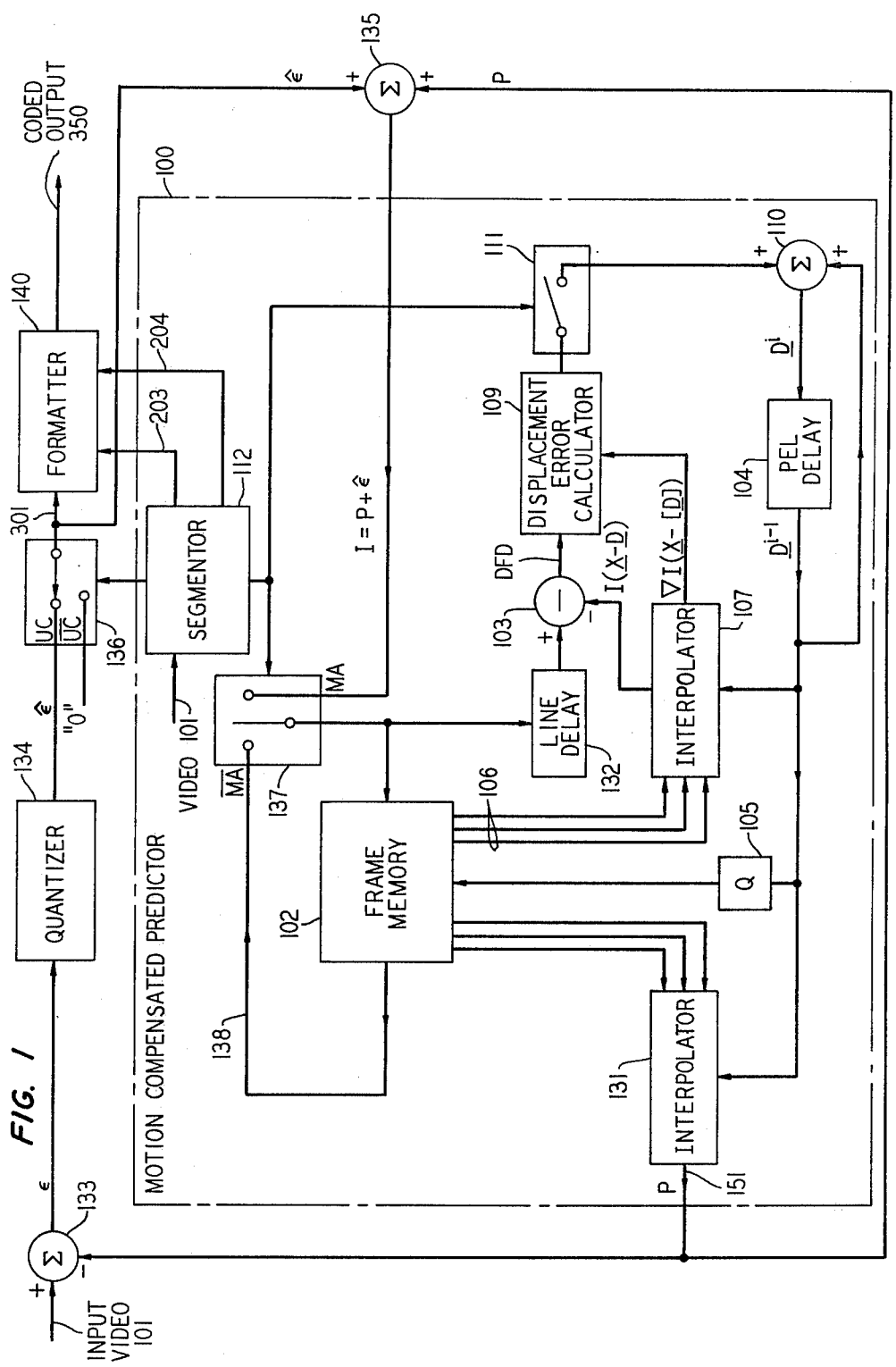
FIG. 1 is a block diagram of a motion compensated encoder constructed in accordance with the present invention.

A block diagram of a first embodiment of a motion compensated video encoder constructed in accordance with the present invention is shown in FIG. 1. At the heart of the circuit is a displacement estimator and an associated predictor, together designated 100, which forms on line 151 a prediction p of the intensity of a moving area in the current frame in accordance with a displacement estimate which describes the location of the same area at a previous time. Advantageously, the displacement estimator is arranged as shown in FIG. 3 of applicants' copending application Ser. No. 021063 entitled "Technique for Estimation of Displacement and/or Velocity of Objects in Television Scenes". The correspondence between elements of FIG. 1 and the circuit of the copending application will be described below.

The displacement estimates generated by the apparatus of FIG. 1 are recursively updated, and, for this purpose, a one element delay circuit 104 is provided to supply the previous estimate $\hat{D}^{i-1}$ to one input of an adder 110 which receives its second input from displacement error calculator 109. The latter, which corresponds to calculator 309 of the copending application, provides a displacement error or update of $\hat{D}^{i-1}$, the $i-1^{th}$ estimated displacement during the time interval $[t-\tau, t]$, which is proportional to $$DFD(X_a, \hat{D}^{i-1}) \nabla I(X_a - [\hat{D}^{i-1}], t-\tau), \qquad (1)$$

where DFD($X_a, \hat{D}^{i-1}$) is the displaced frame difference, i.e., the intensity difference between vector location $X_a$ (the picture element which is being processed) in the present frame, and a location displaced from $X_a$ by vector $\hat{D}^{i-1}$ in the previous frame, and where $\nabla I$ is the intensity gradient measured at the displaced location in the previous frame. As discussed in the copending application, $[\hat{D}^{i-1}]$ is the truncated or rounded value of $\hat{D}^{i-1}$ which simplifies calculation of the gradient by interpolation of stored intensity values. The output of adder 110 is the new displacement estimate $\hat{D}^i$, also a vector quantity.

As in the copending application, displacement estimates are updated only in the picture area in which there is movement, and, for this purpose a switch 111 is interposed between the output of calculator 109 and adder 110. Switch 111 is closed under the control of a segmenter 112, similar to segmenter 312 of the copending application, but which performs additional functions as described below. Segmenter 312 receives the input video signal on line 101.

The displacement estimate $\hat{D}^{i-1}$ output from delay circuit 104 is input to first and second interpolators 131 and 107, and to a quantizer 105 which corresponds to quantizer 305 of the copending application. This quantizer can either round or truncate the displacement estimate to an integral value $[\hat{D}^{i-1}]$, which is then applied to the address input of a frame memory 102. Memory 102 then returns, on lines 106, a series of stored intensity values for picture elements in the neighborhood of the location specified by $[\hat{D}^{i-1}]$. As stated in the copending application, memory 102, which corresponds memory 302 of FIG. 3 therein, may be a tapped delay line and associated control circuitry arranged to derive outputs from appropriate taps, as will be well known to those skilled in the art.

The intensity values from memory 102 and the displacement estimate from delay circuit 104 are used by interpolator 107 to form two quantities, namely the intensity values $I(X-\hat{D}^{i-1})$ at the picture location specified by the displacement estimate, and the intensity gradient $\nabla I(X-[\hat{D}^{i-1}], t-\tau)$ at the displaced location (after rounding or truncation) at time $t-\tau$, when $\tau$ is the time period between the present frame and the prior frame stored in memory 102. Both calculations may be made by straightforward linear interpolation, as explained in connection with interpolator 307 of the copending application. The gradient value is coupled directly to calculator 109, while the intensity value is applied to one input of a subtractor circuit 103, the other input of which is the intensity value input to frame memory 102, but delayed by one line period in a delay circuit 132. It should be noted here that the line delay is provided because a new intensity value for the presently processed pel has not yet been entered in memory 102; the value of the immediately preceeding pel could have been used, by replacing the line delay with an element delay. However, this alternative would place processing time limitations on the apparatus which can be avoided by use of the longer line interval. The output of subtractor circuit 103 is the displaced frame difference DFD at the location specified by $\hat{D}^{i-1}$, and this value is also applied to calculator 109, for use in formation of the update term given in equation (1) above.

The preceeding description of the displacement calculation can be summarized by noting that a displacement estimate is formed for each picture element in the moving area of the picture, and each estimate is updated using the previous estimate. The feedback used to enable the recursion is provided by the displaced frame difference and an intensity gradient values input to calculator 109, both of which are functions of the previous displacement estimate.

In addition to coupling neighborhood intensity values to interpolator 107, memory 102 is also arranged to provide a set of appropriately chosen intensity values to interpolator 131, so as to generate a prediction p which will deviate from the present pel intensity value by as small an error as possible. For this purpose, interpolar 131, like interpolator 107, may be a conventional three or four point two-dimensional linear interpolator. The interpolator is made for the location in the previous frame which is identified by the displacement estimator, since the intensity value at that location should most closely match the intensity of the picture element presently being processed.

The predicted intensity value output from interpolator 131 is applied to subtractor circuit 133 which forms an error signal $\epsilon$ which is the difference between the predicted and the actual intensity value of the input video signal on line 101. This difference is applied to a conventional quantizer 134.

In accordance with the present invention, the error signal $\hat{\epsilon}$ output from quantizer 134 is applied to a channel formatter 140 via a switch 136, the position of which is controlled by segmenter 109. With the switch closed, the quantized prediction error $\hat{\epsilon}$ is encoded. However, when the switch is open, in picture areas that are called compensable or background, the value of $\hat{\epsilon}$ is not transmitted to the receiver, since the value can be reconstructed adequately from previously encoded values.

The predicted intensity value output from interpolator is combined with the error signal passed through switch 136 in an adder circuit 135 in order to generate a reconstructed or decoded intensity value $\hat{I} = p + \hat{\epsilon}$. This decoded value is re-entered in frame memory 102, via a switch 137, so that the intensity values stored in memory 102 are appropriately updated for picture elements in the moving area. However, for background (non-moving area) picture elements, switch 137 is arranged to recirculate the output of memory 102 to its input, on line 138. Switch 137 is arranged to operate in unison with switch 111 under control from segmenter 109.

In accordance with an important feature of the present invention, segmenter 109 is arranged to allow encoding of quantized prediction error values $\hat{\epsilon}$ only within the moving area for non-compensable picture elements which, as will be defined below, are those pels for which the displaced frame difference DFD exceeds a threshold, indicating that motion compensated prediction is inadequate. In these non-compensable cases, switch 136 is closed, and the error value $\hat{\epsilon}$ is coupled to formatter 140. With switch 136 open, $\hat{\epsilon} = 0$, and memory 102 receives either the predicted intensity value p (in moving areas) or the stored intensity value from the previous frame (in non-moving areas). Here again, segmenter 109 differentiates between moving and background areas by comparing a picture function (in this case frame difference (FDIF)) with a threshold.

Figure 2:
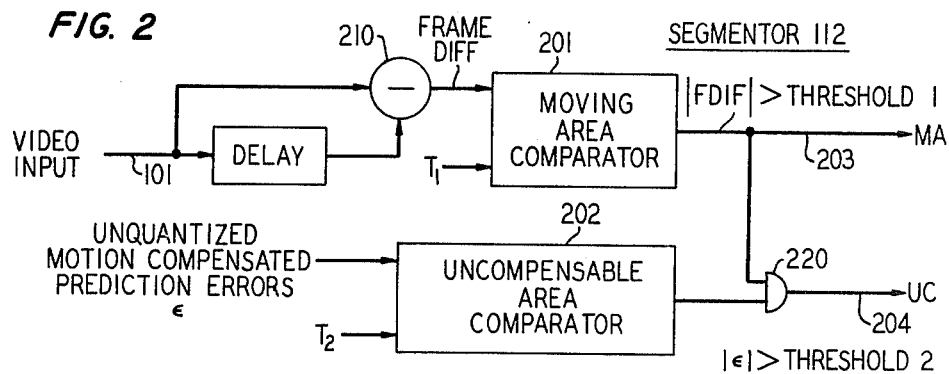
FIG. 2 is a block diagram of segmenter 112 of FIG. 1.

Segmenter 112 is shown in block diagram form in FIG. 2. The segmenter includes two comparators 201 and 202, each of which are arranged to compare an input signal to a preselected threshold value $T_1$ and $T_2$, respectively. The input to comparator 201 is the intensity difference between each picture element and the spatially corresponding pel intensity value from the previous frame, as computed by subtractor circuit 210. A suitable frame delay may be provided by a separate delay circuit 205, or frame memory 102 can be used for this purpose. This intensity difference is, of course, the frame difference signal FDIF used in prior art conditional replenishment coders. If $FDIF > T_1$, a moving area (MA) is detected, raising the level on line 203. If the threshold is not exceeded, a non-moving or background area is present. The MA signal is used to control switches 111 and 137 of FIG. 1. Other more sophisticated techniques may be used for identifying moving areas in the picture, as will be appreciated by those skilled in the art.

The input to comparator 202 is the unquantized motion compensated prediction error $\epsilon$ output from adder 133 of FIG. 1. If $\epsilon > T_2$ and, in addition, if a moving area has been detected, the output of AND gate 220, designated UC, goes high, indicating a non-compensable area for which a prediction error value $\hat{\epsilon}$ must be transmitted. In this case, switch 136 connects the output of quantizer 134 to channel formatter 140. If the prediction error does not exceed the threshold, an error value $\hat{\epsilon} = 0$ is input to formatter 140 and to adder 135.

Referring to FIG. 3, channel formatter 140 of FIG. 1 receives the quantized prediction error $\hat{\epsilon}$ from quantizer 134 on line 301, when switch 136 is closed, and moving area (MA) and uncompensable area (UC) control signals on lines 203 and 204, respectively, from the segmenter of FIG. 2. The purpose of formatter is to encode address information indicating the different picture areas, i.e., (1) background, (2) compensable and (3) non-compensable areas, using run length encoding techniques, and to encode the prediction error values for the non-compensable pels, using variable length coding. Since three different types of areas are involved, a code indicating the type of picture area must also be transmitted.

Since the statistical properties of run lengths of different types of area may vary, the formatter of FIG. 3 may include three separate code memories 304, 305 and 306, each of which stores a dictionary of run length code words used for a particular type of run: memory 304 stores run length codes for background areas, memory 305 stores run length codes for uncompensable areas, and memory 306 is used to store compensable area run length codes. The length of the run or segment to be run length coded is determined by a segment detector and encoder 320 in conjunction with a run length encoder 308. The segment detector and encoder receives the MA and UC control signals and, in a manner to be explained below, generates a start of segment signal S on line 340. This signal is applied to run length encoder 308, which in turn, provides a run length to each of the code memories 304–306. A segment type signal on line 360 is also encoded and concurrently controls the position of a data selector 341, so that the run length code appropriate to the area type being processed is coupled back to encoder 308 on line 342. Specifically, selector 341 assumes the first position for background pels, the second position for uncompensable pels, and the third position for compensable pels. The run length codes output from encoder 308 are stored in a first in/first out (FIFO) buffer 310 prior to being multiplexed into an output buffer 351.

The quantized prediction error value $\hat{\epsilon}$ received from switch 136 on line 301 are applied to a variable length encoder 314, which may be a conventional Huffman coder of the type described in D. A. Huffman, "A Method for the Construction of Minimum Redundancy Codes", *Proceedings of IRE*, Vol. 40, 1952, pp. 1098–1101. The variable length code words generated by coder 314 are entered in a second FIFO buffer 315, prior to entry in buffer 351, again via multiplexer 311. Since the code word T indicative of which area type is being encoded must itself be transmitted, the T code word on line 360 is applied to a segment type buffer 316, the output of which is also coupled to buffer 351 via multiplexer 311.

The operating sequence of multiplexer 311 is controlled by a logic circuit 361, which is responsive to the segment type code word T generated by detector 320. Generally, logic 361 alternates between buffer 316 and buffer 310, such that a segment type code word is followed by a run length code indicating the number of consecutive picture elements which are of the same type, i.e., background or compensable moving area. However, when logic 361 detects a type code word indicating an uncompensable area, the run length code for that area is followed by the variable length words stored in buffer 315 which indicate the prediction error values for each of that area's pels.

Figure 4:
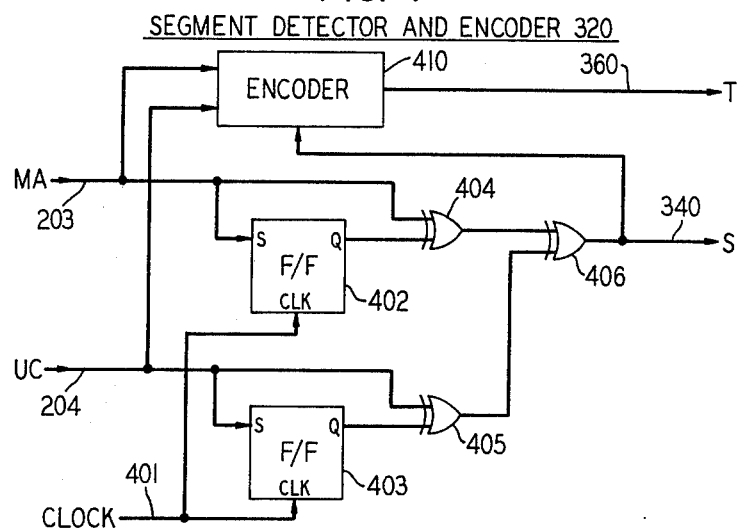
FIG. 4 is a block diagram of segment detector and encoder 320 of FIG. 3.

A block diagram of segment detector and encoder 320 is shown in FIG. 4. The moving area (MA) and uncompensable area (UC) signals on lines 203 and 204 are each applied to a respective flip-flop 402 and 403, both of which are reset at each pel time by a clock system pulse on line 401. The flip-flop outputs and inputs are then compared in a pair of exclusive OR gates 404 and 405. If either of the gate outputs is high, a segment transition has been detected, and the S signal is coupled to run length encoder 308 of FIG. 3 via an OR gate 406 and line 340. Detector 320 also includes a coder 410 which receives the MA and UC control signals and the S signal and generates an appropriate segment type code word T on line 360 which uniquely indicates the type of segment being processed. A code word is generated each time the S signal indicates the start of a new segment.

Figure 5:
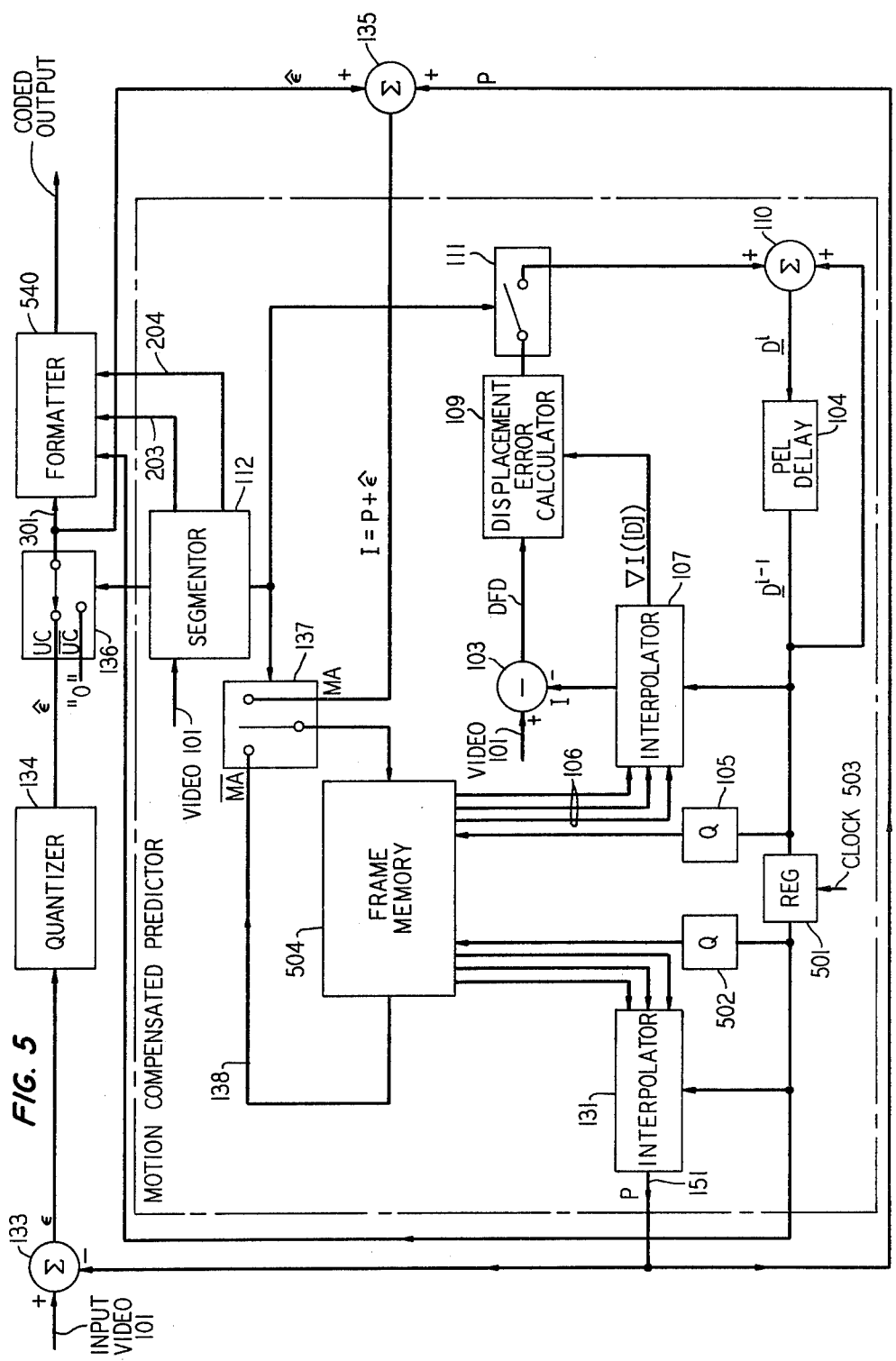
FIG. 5 is a block diagram of a second motion compensated encoder embodiment in which displacement estimates are encoded.

As stated previously, the encoder of FIG. 1 is arranged, in accordance with the invention, to encode address information concerning three types of picture areas, namely background, compensable moving areas and non-compensable moving areas, and to encode prediction error values only for picture elements in the latter area. While displacement information is available in the encoder of FIG. 1, it is not encoded or transmitted, since accurate decoding can be accomplished, as described hereinafter. Should it be desired, however, to encode displacement data along with the addresses and prediction error values, this modification is readily made, as shown in FIG. 5. In this figure, elements identical to those of FIG. 1 retain the same reference designations.

Since displacement estimates calculated in the encoder are available in the receiver, the displacement calculation in the encoder of FIG. 5 can be based on the actual input video data, rather than on the reconstructed (decoded) intensity values output from adder circuit 135 or the recirculated background intensity values on line 138, as is the case in the apparatus of FIG. 1. Accordingly, line delay circuit 132 is eliminated, and the intensity values input to subtractor 103 are derived directly from input line 101.

In order to provide the capability of controlling the frequency at which displacement estimates are encoded, the estimates output from delay circuit 104 are applied to a register 501, which provides an output only when clock pulses are applied on line 503. At each such pulse, the displacement estimate stored in register 501 is coupled to interpolator 131 and formatter 540. Concurrently, the displacement estimate is applied to frame memory 504 via quantizer 502, so that the frame memory can in turn apply appropriate intensity values of displaced picture elements to interpolator 131. As in the embodiment of FIG. 1, a quantizer 105 continuously couples the output of delay circuit 104 to frame memory 504, so that the intensity values input to interpolator 107 reflect each recursively updated displacement estimate, rather than only those estimates clocked by pulses on line 503. Naturally, in the embodiment of FIG. 5, the formatter 540 must be suitably modified to include the displacement estimates and unique flag words indicative thereof. This modification will be apparent to those skilled in the art. It is also to be understood that the displacement estimate values will themselves contain redundant information which can be decreased using established compression techniques.

Figure 6:
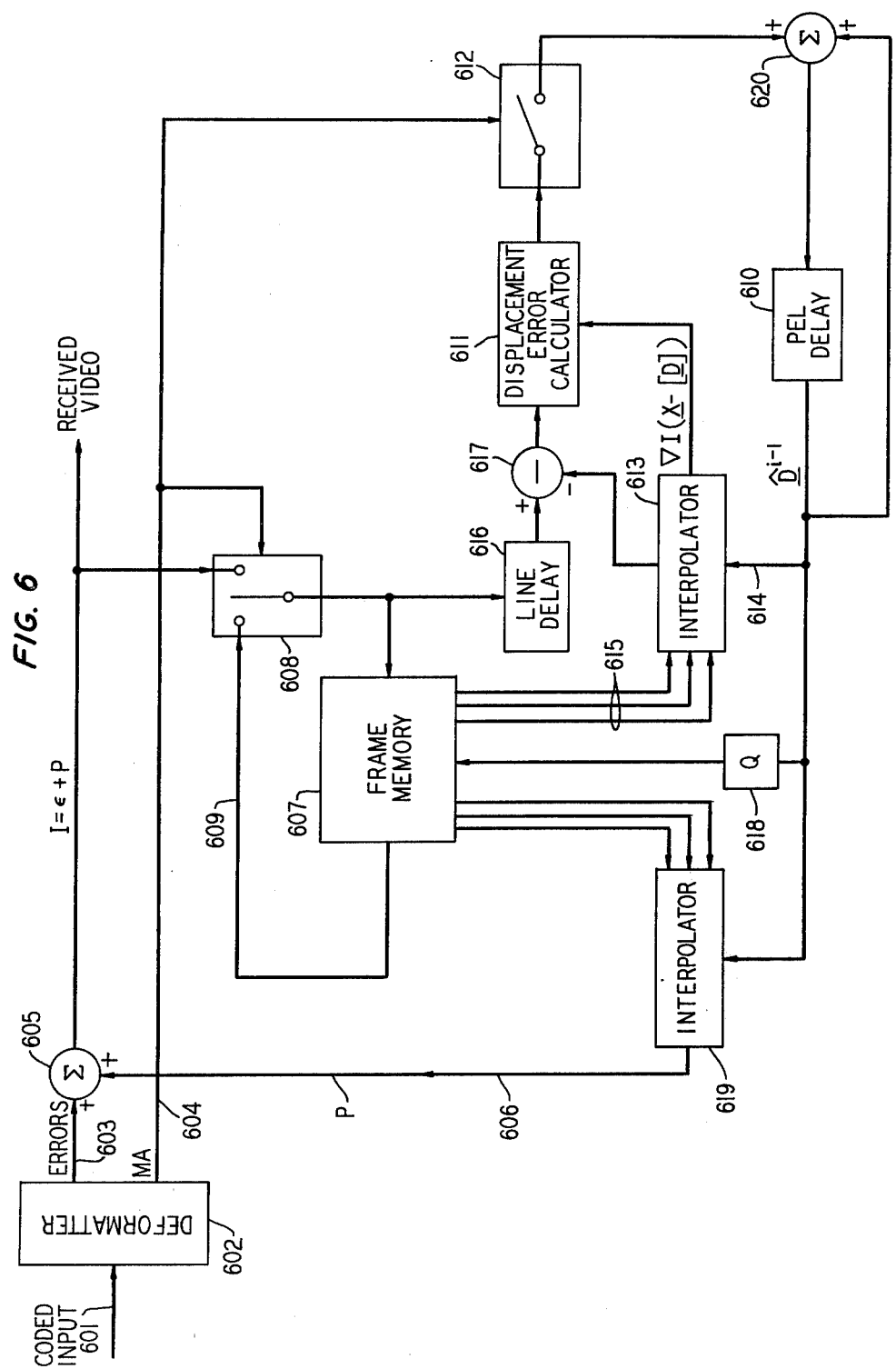
FIG. 6 is a block diagram of apparatus for decoding the output of the encoder of FIG. 1.

The picture intensity information encoded by the apparatus of FIG. 1 may be decoded with apparatus shown in block diagram form in FIG. 6. The coded input received on line 601 is applied to a deformatter 602, shown in detail in FIG. 7, which separates the incoming signal into error values on line 603 and an MA signal indicating moving area on line 604. The error values are applied to one input of an adder circuit 605, the other input of which receives predicted intensity values p from line 606. The output of adder circuit 605 is the decoded video signal, which is fed back to a frame memory 607 via a switch 608. The position of switch 608 is controlled by the MA signal on line 604, such that the decoded intensity value output from adder circuit 605 is entered in memory 607 in the moving area of the picture, but the previously stored intensity value is fed back on line 609 when MA is low, indicating a non-moving or background picture element.

The remaining apparatus in the decoder circuit of FIG. 6 uses displacement estimation and prediction techniques comparable to those used in the apparatus of FIG. 1. Briefly, delay element 610 stores the previous displacement estimate $\hat{D}^{i-1}$, which is updated by the output from displacement error calculator 611 in accordance with equation (1). However, updating occurs (using adder circuit 620), only in the moving area, in which switch 612 is closed.

The displacement estimate stored in delay circuit 610 is coupled to memory 607 via quantizer 618, which rounds or truncates the displacement value to enable selection of appropriate stored intensity values from the memory. These values, for picture elements in the neighborhood of the displaced location $(x-[\hat{D}^{i-1}])$ are applied to interpolator 613 on lines 615 together with the non-quantized value of $\hat{D}^{i-1}$ on line 614. Interpolator 613, in turn, computes the intensity value at the displaced location $(x-[\hat{D}^{i-1}])$ and the intensity gradient at that location. The former is subtracted from a line delayed version of the present pel intensity value (via delay circuit 616) in a subtraction circuit 617, and the resulting displaced frame difference DFD is applied to displacement error calculator 611 together with the gradient value mentioned above. Concurrently, the output of quantizer 618 causes memory 607 to apply intensity values of pels which surround the displaced location $x-[\hat{D}^{i-1}]$ to interpolator 619, which also receives the unquantized output $\hat{D}^{i-1}$ of delay circuit 610. Interpolator 619 forms the predicted value p at the displaced location using conventional linear interpolation.

The error values and the moving area signal (MA) are separated from the received coded input by deformatter 602, shown in detail in FIG. 7. Initially, the input data on line 601 is stored in a buffer 701, the output of which is fed through a data switch 702 to a segment detector and decoder 704. The outputs of detector and decoder 704 are first and second control signals on lines 705 and 706 which are used to recover the UC and MA control signals, respectively. The deformatter and decoder of FIG. 7 also includes logic 703 which causes switch 702 to alternate between detector/decoder 704 and a run length decoder 708, such that each segment type code is routed to the detector/decoder and each subsequent run length code is routed to decoder 708. However, when a type code word is received indicating an uncompensable area, logic 703 causes switch 702 to route the corresponding prediction error values to a variable length decoder 709 after the run length code for that area has been applied to decoder 708.

The run length code words applied to decoder 708 are routed to a series of code memories 710-712 which correspond to code memories 304-306 of FIG. 3. Specifically, memory 710 is arranged to decode runs in background areas, memory 711 is arranged to decode runs in uncompensable areas, and memory 712 is used for decoding compensable area runs. An output from the appropriate code memory is selected by the position of a data switch 713, which is controlled by the type code word T output from switch 702 on line 707.

For any given run length, decoder 708 supplies a corresponding series of "1" bits to the clock inputs of first and second flip-flops 714 and 715. Flip-flop 714 is set by the first control signal output from detector/decoder 704 on line 706, and the output of this flip-flop is the MA control signal. Flip-flop 715 is set by the second control signal output from detector/decoder 704 on line 705, and the output of this flip-flop is the UC control signal.

When an uncompensable segment is detected, the prediction error code bits are decoded by decoder 709, which performs a function inverse to that of encoder 314 of FIG. 3. The output of decoder 709, which is the error value for each uncompensable picture element, is stored in a buffer 716, and connected to output line 603 when switch 717 is closed by the UC control signal output from flip-flop 715.

Figure 8:
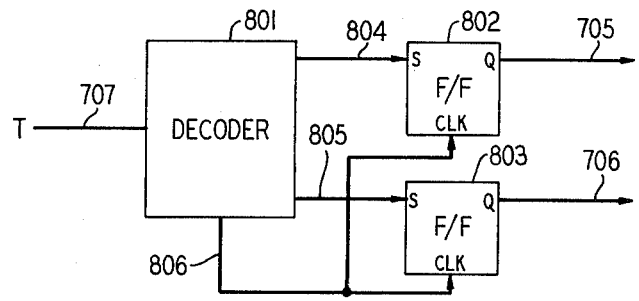
FIG. 8 is a block diagram of segment detector and decoder 704 of FIG. 7.

Segment detector 704 may be arranged as shown in block diagram form in FIG. 8. Segment type code words T are received on line 707 and applied to a decoder 801 which is the inverse of encoder 410 of FIG. 4. Upon recognition of a code word on line 707, decoder 801 provides UC and MA control signal levels on lines 804 and 805, respectively, that correspond to the indicated segment type. These levels are clocked into respective flip-flops 802 and 803 when each word is decoded via a timing pulse on line 806. The outputs of flip-flops 802 and 803 are the first and second control signals referred to previously.

Various modification and adaptations of the present invention will be readily apparent to those skilled in the art. Accordingly, it is intended that the invention be limited in scope only by the following claims. For example, in the prior discussion, $\tau$ was generally taken to be the time interval between successive frames. It should be realized that the time between *fields* could instead be used, or indeed any other interval between different representations of a video scene. With such modifications, the value of DFD would be interpreted to mean the intensity difference which occurs due to displacement during the chosen time interval, rather than between successive frames.

We claim:

1. Apparatus for encoding a video signal representing the intensity values of a plurality of picture elements including,
   means (100) for predicting the intensity values of picture elements in a present frame of said signal using estimates of displacement of objects in said picture between said present frame and a prior frame,
   wherein said apparatus is characterized by
   (1) means (104) for storing an initial estimate of said displacement, and
   (2) means (109) responsive to said storing means for repeatedly updating said stored estimate.

2. The invention defined in claim 1 wherein said updating means (109) is arranged to compute an update term proportional to the product of $$DFD(x,\hat{D}^{i-1}) \text{ and } \nabla I(x-[\hat{D}^{i-1}],t-\tau),$$

where $\hat{D}^{i-1}$ is said initial displacement estimate, x is the vector location corresponding to the intensity value presently being processed, $DFD(x,\hat{D}^{i-1})$ is the intensity difference between location x in the present frame and location $x-\hat{D}^{i-1}$ in the previous frame, $\tau$ is the time between said present frame and said previous frame, and $\nabla I$ is the intensity gradient at the displaced location in said previous frame.

3. The invention defined in claim 1 wherein said apparatus further includes
   means (133) for forming an error signal indicative of the difference between each of said intensity values and the predicted value thereof, and
   means (102, 136) for encoding said error signal only for a first set of picture elements wherein said error signal exceeds a threshold value.

4. The invention defined in claim 3 wherein said apparatus further includes
   means (201) for determining a second set of picture elements in moving areas in said picture, and
   means (111) for operating said updating means (109) only in said moving areas.

5. The invention defined in claim 4 wherein said apparatus further includes means (140) for encoding data indicating the locations of picture elements in said first and second sets.

6. The invention defined in claim 1 wherein said predicting means includes
   a memory (102) for storing intensity values of picture elements in said prior frame,
   an interpolator (131) for receiving selected stored intensity values from said memory, and
   means (105) for applying one of said displacement estimates to said memory to select particular ones of said stored intensity values corresponding to elements of said picture in a neighborhood determined by said displacement estimate.

7. Apparatus for encoding a video signal representing the intensity values of elements of a picture including,
   means (100) for predicting the intensity value of each of said picture elements,
   means (133) for generating an error value representing the difference between each of said intensity values and the corresponding predicted value, and
   means (135) for combining said error value with said predicted value to generate a decoded intensity value, said predicting means including
   means (102) for storing decoded intensity values of pels in the previous frame of said video signal, and
   means (105, 131) for selecting appropriate pels for said prediction from said storing means in response to an estimate of displacement of an object in said picture,
   wherein said apparatus is characterized by
   means (103, 107, 109) for calculating an initial estimate of said displacement, and
   means (104) for recursively updating said initial displacement estimate.

8. The invention defined in claim 7 wherein said calculating means includes
   means (107) for computing the intensity and the intensity gradient at a particular location in said previous frame, said particular location being displaced from the location presently being processed by said displacement estimate,
   means (103) for forming the difference between said computed intensity and the intensity of said presently processed location, and
   means (109) for forming the product of said intensity difference and said intensity gradient.

9. The invention defined in claim 8 wherein said apparatus further includes
   means (201) for generating a first control signal in moving areas of said picture, and
   means (111) for operating said updating means only in said moving areas.

10. The invention defined in claim 9 wherein said apparatus further includes
    means 202, 204 for generating a second control signal in moving areas of said picture wherein said error value exceeds a threshold, and
    means (140) responsive to said first and second control signals for encoding:
    (a) locations of non-moving areas in said picture;
    (b) locations of moving areas in said picture wherein said error value is below said threshold, and
    (c) both locations and error values of moving areas in said picture where said threshold is exceeded.

11. Apparatus for encoding a video signal which represents the intensity values of elements of a picture, including
    (a) means for computing an estimate of the translation of objects in said picture occurring during a time period $\tau$ between first and second representations of said picture;
    (b) means for predicting the intensity values of pels in said first representation based upon intensity values of pels in said second representation and said estimate of translation;
    (c) means for comparing each predicted value with the corresponding true value to generate an error value, and
    (d) means for encoding said error value only if it does not exceed a threshold,
    wherein said computing means is arranged to recursively update said displacement estimate.

12. The invention defined in claim 11 wherein said computing means is arranged to update a previous translation estimate by a term proportional to the product of (a) the intensity difference between a location x in said first representation and a location $x - \hat{D}^{i-1}$ in said second representation, where $\hat{D}^{i-1}$ is said previous translation estimate, and (b) the intensity gradient at location $x - \hat{D}^{i-1}$ in said second representation.

13. Apparatus for encoding a video signal which includes a plurality of intensity values each of which represents the intensity at a particular location in each frame of a picture, comprising means for estimating the translation of an object in said picture between first and second frames;

means for predicting the intensities of picture elements in said second frame which represent said object based upon the intensities of picture elements in said first frame which are translated in accordance with said estimate, and means for encoding (1) the error value indicating the difference between said values and the predicted values thereof, when said error value exceeds a first threshold, (2) the picture element locations represented by said error values, and (3) the picture element locations of background elements having a frame difference which is below a second threshold.

14. The invention defined in claim 13 wherein said translation estimating means includes means for storing an initial estimate of translation, and means responsive to said storing means for updating said initial estimate.

15. A method of encoding a video signal representing the intensity values of elements of a picture including the steps of predicting the intensity value of each of said picture elements, generating an error value representing the difference between each of said intensity values and the corresponding predicted value, and combining said error value with said predicted value to generate a decoded intensity value, said predicting step including storing decoded intensity values of pels in the previous frame of said video signal, and selecting appropriate pels for said prediction from said storing means in response to an estimate of displacement of an object in said picture, wherein said method is characterized by calculating an initial estimate of said displacement, and recursively updating said initial displacement estimate.

16. The method defined in claim 15 wherein said calculating step includes computing the intensity and the intensity gradient at a particular location in said previous frame, said particular location being displaced from the location presently being processed by said displacement estimate, forming the difference between said computed intensity and the intensity of said presently processed location, and forming the product of said intensity difference and said intensity gradient.

17. The method defined in claim 16 further including the steps of generating a first control signal in moving areas of said picture, and operating said updating means only in said moving areas.

18. The method defined in claim 17 further including the steps of generating a second control signal in moving areas of said picture wherein said error value exceeds a threshold, and encoding, in response to said first and second control signals:

(a) locations of non-moving areas in said picture;

(b) locations of moving areas in said picture wherein said error value is below said threshold, and (c) both locations and error values of moving areas in said picture where said threshold is exceeded.

19. A method of encoding a video signal which includes a plurality of intensity values each of which represents the intensity at a particular location in each frame of a picture, comprising the steps of estimating the translation of an object in said picture between first and second frames;

predicting the intensities of picture elements in said second frame which represent said object based upon the intensities of picture elements in said first frame which are translated in accordance with said estimate, and encoding (1) the error value indicating the difference between said values and the predicted values thereof, when said error value exceeds a first threshold, (2) the picture element locations represented by said error values, and (3) the picture element locations of background elements having a frame difference which is below a second threshold.

20. The method defined in claim 19 wherein said estimating step includes storing an initial estimate of translation, and recursively updating said initial estimate.

* * * * *